(12) United States Patent
Chase et al.

(10) Patent No.: US 11,536,466 B2
(45) Date of Patent: Dec. 27, 2022

(54) SYSTEMS AND METHODS FOR GAS VALVE ASSEMBLY OF AN HVAC SYSTEM

(71) Applicant: Johnson Controls Technology Company, Auburn Hills, MI (US)

(72) Inventors: Thomas D. Chase, Rose Hill, KS (US); Frank D. Ashby, Wichita, KS (US)

(73) Assignee: Johnson Controls Tyco IP Holdings LLP, Milwaukee, WI (US)

( * ) Notice: Subject to any disclaimer, the term of this patent is extended or adjusted under 35 U.S.C. 154(b) by 422 days.

(21) Appl. No.: 16/186,124

(22) Filed: Nov. 9, 2018

(65) Prior Publication Data

US 2020/0109863 A1 Apr. 9, 2020

Related U.S. Application Data

(60) Provisional application No. 62/741,426, filed on Oct. 4, 2018.

(51) Int. Cl.
*F16K 27/00* (2006.01)
*F23N 1/00* (2006.01)
*F24D 19/10* (2006.01)

(52) U.S. Cl.
CPC .......... *F24D 19/1084* (2013.01); *F16K 27/00* (2013.01); *F23N 1/005* (2013.01); *F23N 2235/24* (2020.01)

(58) Field of Classification Search
CPC ......... F16L 3/00; F16L 3/04; Y10T 137/6851; F24D 19/1084; F23N 1/005; F23N 2235/24; F16K 27/00; F16K 27/12; F24C 3/122; F23K 5/007; E03B 7/095; E03B 7/075; F16B 2001/0092; F16B 5/0635; F16M 11/041
See application file for complete search history.

(56) References Cited

U.S. PATENT DOCUMENTS 2,389,522 A * 11/1945 Leppla .................. B60T 17/046
 248/300
2,658,514 A * 11/1953 Meusy ..................... F23N 5/107
 137/66
2,810,536 A * 10/1957 Cunningham ........... F16M 5/00
 248/671

(Continued)

FOREIGN PATENT DOCUMENTS

CN 203704374 U 7/2014
KR 950003371 Y1 4/1995

*Primary Examiner* — Jorge A Pereiro
(74) *Attorney, Agent, or Firm* — Fletcher Yoder, P.C.

(57) ABSTRACT

The present disclosure relates to a gas valve assembly for a furnace. The gas valve assembly includes a gas valve including an inlet flange having an outer geometric profile and defining a gas inlet of the gas valve. The gas valve assembly also includes a bracket having a mounting panel, a first support flange, and a second support flange, where the mounting panel extends between and is integral with the first support flange and the second support flange. A slot is formed in the first support flange and defined by a portion of a perimeter of the bracket. The outer geometric profile of the inlet flange corresponds to a profile of the slot, and the slot is configured to receive and abut a portion of the outer geometric profile. A passage is formed in the second support flange and configured to receive a gas flow from the gas valve.

22 Claims, 7 Drawing Sheets

(56) References Cited

U.S. PATENT DOCUMENTS

| | | | | |
|---|---|---|---|---|
| 3,076,627 A * | 2/1963 | Huron | G01L 7/082 | 248/309.1 |
| 3,080,140 A * | 3/1963 | Gohs | F16L 3/13 | 248/74.1 |
| 3,195,561 A * | 7/1965 | Sovitzky | A47L 15/4217 | 137/315.03 |
| 3,234,992 A * | 2/1966 | Denny et al. | F23D 14/46 | 431/75 |
| 3,264,421 A * | 8/1966 | McIntosh | H01H 35/40 | 200/61.86 |
| 3,302,912 A * | 2/1967 | Hurlburt, Jr. | F16K 27/00 | 248/65 |
| 3,334,405 A * | 8/1967 | Arthurs | F16K 51/00 | 29/257 |
| 3,516,627 A * | 6/1970 | Gable | H02K 5/24 | 248/560 |
| 3,538,940 A * | 11/1970 | Graham | F16L 37/144 | 137/271 |
| 3,923,278 A * | 12/1975 | Marcil | A47G 1/20 | 248/301 |
| 3,937,499 A * | 2/1976 | Courtot | F16K 27/00 | 285/319 |
| 3,983,429 A * | 9/1976 | Allardice, Jr. | H02K 5/24 | 310/91 |
| 4,042,201 A * | 8/1977 | O'Callaghan | B60R 11/0205 | 248/309.1 |
| 4,044,631 A * | 8/1977 | Matousek | F16K 31/363 | 74/606 R |
| 4,116,410 A * | 9/1978 | Boyd, Jr. | F16M 1/04 | 248/581 |
| D249,953 S * | 10/1978 | Drake | D19/91 | |
| 4,142,702 A * | 3/1979 | Lamboo | H01S 3/02 | 248/174 |
| D265,508 S * | 7/1982 | Rusteberg | D24/128 | |
| RE31,525 E * | 2/1984 | Boyd, Jr. | F16M 1/04 | 248/581 |
| 4,429,903 A * | 2/1984 | Baker | F16K 27/00 | 285/24 |
| 4,441,684 A * | 4/1984 | Credle, Jr. | F16M 13/02 | 211/26 |
| 4,585,308 A * | 4/1986 | Negoro | G02B 7/026 | 355/55 |
| 4,720,769 A * | 1/1988 | Raabe | H02B 1/42 | 361/634 |
| 4,896,806 A * | 1/1990 | Sanchez, Jr. | A01K 97/10 | 224/200 |
| 4,951,870 A * | 8/1990 | Ballard | F23N 5/242 | 236/11 |
| 5,009,250 A * | 4/1991 | Kline | B60H 1/00642 | 137/596.17 |
| 5,081,849 A * | 1/1992 | Thompson | F24F 1/027 | 62/262 |
| 5,222,768 A * | 6/1993 | Hofer | F16L 19/005 | 285/39 |
| D337,851 S * | 7/1993 | Gary | D26/138 | |
| 5,290,005 A * | 3/1994 | Akiyama | H02K 5/00 | 248/222.12 |
| 5,362,111 A * | 11/1994 | Harbin | F16L 19/005 | 285/330 |
| 5,417,401 A * | 5/1995 | Thompson | F24F 1/027 | 248/300 |
| 5,488,259 A * | 1/1996 | Cho | F16M 7/00 | 310/91 |
| 5,752,685 A * | 5/1998 | Tyan | F16M 11/08 | 248/218.4 |
| 5,992,410 A * | 11/1999 | Raleigh | F23D 14/02 | 126/110 AA |
| 6,167,604 B1 * | 1/2001 | Del Bono | B25B 13/48 | 29/237 |
| 6,371,057 B1 | 4/2002 | Henderson | | |
| 6,422,520 B1 * | 7/2002 | Hand | F16L 3/02 | 137/359 |
| 6,497,570 B1 * | 12/2002 | Sears | F23C 5/02 | 126/110 R |
| 6,533,230 B2 * | 3/2003 | Fullenkamp | B60G 13/006 | 248/300 |
| 6,651,691 B2 | 11/2003 | Phipps | | |
| 6,666,421 B2 | 12/2003 | Hueser | | |
| 6,684,901 B1 * | 2/2004 | Cahill | F16K 31/0655 | 137/15.18 |
| 6,695,001 B2 | 2/2004 | Dicosola | | |
| 6,729,598 B2 * | 5/2004 | Folliot | B60N 2/0232 | 248/671 |
| 6,742,572 B2 * | 6/2004 | Muhammad | B21D 53/085 | 165/153 |
| 6,755,379 B2 * | 6/2004 | Kirschner | A62C 31/28 | 169/37 |
| 6,857,662 B2 * | 2/2005 | Chu | F16L 25/0018 | 285/24 |
| 6,908,116 B2 * | 6/2005 | Chu | F16L 25/065 | 285/39 |
| D513,168 S * | 12/2005 | Chu | D8/356 | |
| 7,003,859 B2 * | 2/2006 | Lehner | B25B 27/14 | 29/402.01 |
| 7,021,334 B1 * | 4/2006 | Helmer | B60D 1/64 | 137/615 |
| 7,089,761 B2 | 8/2006 | Nungesser | | |
| 7,172,221 B1 * | 2/2007 | Ferrara | A62C 35/68 | 248/65 |
| D556,546 S * | 12/2007 | Swanson | D8/354 | |
| 7,562,788 B2 * | 7/2009 | Watanabe | B60K 15/03006 | 220/562 |
| 7,631,846 B2 | 12/2009 | Arnold et al. | | |
| 7,633,017 B2 | 12/2009 | Young et al. | | |
| 7,677,514 B1 * | 3/2010 | Palmer | B60K 15/067 | 248/250 |
| 7,918,204 B2 * | 4/2011 | Gignac | B01D 35/30 | 123/195 A |
| 7,931,162 B2 * | 4/2011 | Swanson | B67D 3/0087 | 211/194 |
| 7,938,383 B2 * | 5/2011 | Zur | H01F 7/126 | 251/129.15 |
| 8,235,064 B2 * | 8/2012 | Kasprzyk | F16K 31/0655 | 137/1 |
| 8,382,046 B2 * | 2/2013 | Holland, Jr. | A01G 25/00 | 248/73 |
| D693,443 S * | 11/2013 | Puluc | D23/262 | |
| 8,641,010 B2 * | 2/2014 | Christensen | H01F 7/127 | 251/129.15 |
| 8,899,264 B2 * | 12/2014 | Young | F23N 1/005 | 137/554 |
| 9,074,619 B2 * | 7/2015 | Yamauchi | F16C 1/105 | |
| 9,109,724 B2 * | 8/2015 | Meissner | A62C 35/68 | |
| D759,474 S * | 6/2016 | Pittman | D8/395 | |
| 9,360,143 B2 | 6/2016 | Jones | | |
| D771,805 S * | 11/2016 | Brooker | D24/128 | |
| 9,586,540 B2 * | 3/2017 | Kim | B60R 16/0215 | |
| 9,677,691 B2 * | 6/2017 | Multer | F16L 3/00 | |
| 9,784,303 B2 * | 10/2017 | Jang | F16C 1/101 | |
| D805,369 S * | 12/2017 | Vassar | D8/349 | |
| 9,964,220 B1 * | 5/2018 | Ro | F16K 31/0675 | |
| 10,139,015 B2 * | 11/2018 | VanValkenburgh | F16L 3/02 | |
| 10,429,005 B2 * | 10/2019 | Patel | F16N 7/00 | |
| 10,494,799 B2 * | 12/2019 | Adriano | F16L 3/1218 | |
| D872,230 S * | 1/2020 | Yamabe | D23/233 | |
| D891,229 S * | 7/2020 | Hohmann, Jr. | D8/354 | |
| 10,960,288 B2 * | 3/2021 | Armstrong | A45F 5/00 | |
| 2002/0100520 A1 * | 8/2002 | Olsen | F16K 1/308 | 141/346 |
| 2005/0045039 A1 * | 3/2005 | Shellhammer | B01D 46/30 | 96/108 |
| 2005/0257784 A1 * | 11/2005 | Albizuri | F24C 3/12 | 126/39 N |
| 2007/0176068 A1 * | 8/2007 | Kuo-Chen | F16K 27/067 | 248/300 |
| 2008/0001054 A1 * | 1/2008 | Swanson | F16B 5/0635 | 248/544 |
| 2008/0087233 A1 * | 4/2008 | Waller | F23Q 9/00 | 122/14.1 |

(56) References Cited

U.S. PATENT DOCUMENTS

| | | | |
|---|---|---|---|
| 2008/0142674 A1* | 6/2008 | Dang | F04B 39/12 248/674 |
| 2010/0282988 A1* | 11/2010 | Kasprzyk | F16K 31/0675 251/129.15 |
| 2010/0300952 A1* | 12/2010 | Clausen | B01D 35/30 210/236 |
| 2011/0271880 A1* | 11/2011 | Thompson | F23N 5/184 110/186 |
| 2012/0060953 A1* | 3/2012 | Trent | F25B 45/00 29/428 |
| 2012/0061106 A1* | 3/2012 | McAllister | F16L 41/12 169/5 |
| 2012/0066870 A1* | 3/2012 | Quaglia | F16C 1/265 24/122.3 |
| 2012/0151727 A1* | 6/2012 | Dewell | B25B 27/10 29/237 |
| 2012/0279589 A1* | 11/2012 | Morris | F16K 27/029 137/561 R |
| 2013/0152673 A1* | 6/2013 | Young | F23N 1/002 73/40.7 |
| 2013/0153035 A1* | 6/2013 | Young | F23N 1/005 137/1 |
| 2013/0153036 A1* | 6/2013 | Young | F16K 37/0041 137/1 |
| 2013/0153041 A1* | 6/2013 | Kucera | F23N 1/002 137/14 |
| 2013/0153042 A1* | 6/2013 | Young | F17D 5/02 137/14 |
| 2013/0153062 A1* | 6/2013 | Young | F23N 1/002 137/557 |
| 2013/0153798 A1* | 6/2013 | Kucera | F23N 1/002 251/129.01 |
| 2013/0154841 A1* | 6/2013 | Kucera | F16K 37/0091 340/605 |
| 2014/0367351 A1* | 12/2014 | Juen | A63B 21/169 211/85.7 |
| 2015/0114485 A1* | 4/2015 | Amador | B25B 13/5033 137/328 |
| 2015/0270637 A1* | 9/2015 | Islam | H01R 13/64 439/533 |
| 2015/0316264 A1* | 11/2015 | Prichard | F24H 9/2021 431/43 |
| 2016/0069473 A1* | 3/2016 | Kucera | F16K 37/0041 137/637 |
| 2016/0077531 A1* | 3/2016 | Kucera | F16K 37/0091 137/2 |
| 2016/0097403 A1 | 4/2016 | Russell et al. | |
| 2016/0122176 A1* | 5/2016 | Fogg | F16M 13/00 248/602 |
| 2016/0131398 A1* | 5/2016 | Hanks | F23D 23/00 431/189 |
| 2016/0178236 A1* | 6/2016 | Garloch | F24H 3/00 126/116 A |
| 2016/0284193 A1* | 9/2016 | Davis | G01M 3/18 |
| 2016/0299172 A1* | 10/2016 | Patel | G01R 1/06772 |
| 2017/0074419 A1* | 3/2017 | Tamarkin | F16K 35/10 |
| 2017/0089586 A1 | 3/2017 | Turner | |
| 2017/0314720 A1* | 11/2017 | Iturbe Arriola | F16L 55/07 |
| 2018/0106698 A1* | 4/2018 | Karg | F23K 5/007 |
| 2018/0238031 A1* | 8/2018 | Kulzer | E03B 9/08 |
| 2018/0363795 A1* | 12/2018 | Tamarkin | F16K 27/12 |
| 2019/0017622 A1* | 1/2019 | Leeseberg | F16K 31/0682 |
| 2019/0376687 A1* | 12/2019 | Super | F23N 1/022 |

\* cited by examiner

SYSTEMS AND METHODS FOR GAS VALVE ASSEMBLY OF AN HVAC SYSTEM

CROSS-REFERENCE TO RELATED APPLICATIONS

This application claims priority from and the benefit of U.S. Provisional Application Ser. No. 62/741,426, entitled "SYSTEMS AND METHODS FOR GAS VALVE ASSEMBLY OF AN HVAC SYSTEM," filed Oct. 4, 2018, which is herein incorporated by reference in its entirety for all purposes.

BACKGROUND

This disclosure relates generally to heating, ventilation, and/or air conditioning (HVAC) systems. Specifically, the present disclosure relates to a gas valve assembly for a furnace system of HVAC units.

This section is intended to introduce the reader to various aspects of art that may be related to various aspects of the present techniques, which are described and/or claimed below. This discussion is believed to be helpful in providing the reader with background information to facilitate a better understanding of the various aspects of the present disclosure. Accordingly, it should be understood that these statements are to be read in this light and not as an admission of any kind.

A heating, ventilation, and/or air conditioning (HVAC) system may be used to thermally regulate an environment, such as a building, home, or other structure. Conventional HVAC systems often include a furnace system that may be used to heat an air flow supplied to an air distribution system of the building. For example, typical furnace systems may include a burner assembly and a heat exchanger that cooperate to produce hot air, which may be directed through the air distribution system to heat a room or other space within the building. Generally, furnace systems operate by burning or combusting a mixture of air and fuel in the burner assembly to produce combustion products that are directed through tubes or piping of the heat exchanger. An air flow passing over the tubes or piping extracts heat from the combustion products, thereby enabling the exportation of heated air from the furnace system.

Flow parameters of the fuel are typically regulated via a gas valve of the furnace system that is in fluid communication with the burner assembly. In many cases, conventional gas valves are coupled directly to a manifold of the burner assembly that is configured to support the gas valve within a housing of the furnace system. Unfortunately, coupling the gas valve to the burner assembly manifold may result in inopportune placement of the gas valve within the housing, such that access to the gas valve may be obstructed. Moreover, in some cases, the burner assembly manifold may be insufficiently sturdy or rigid and may therefore not block or limit undesirable movement or vibration of the gas valve.

SUMMARY

The present disclosure relates to a gas valve assembly for a furnace. The gas valve assembly includes a gas valve including an inlet flange having an outer geometric profile and defining a gas inlet of the gas valve. The gas valve assembly also includes a bracket having a mounting panel, a first support flange, and a second support flange, where the mounting panel extends between and is integral with the first support flange and the second support flange. A slot is formed in the first support flange and defined by a portion of a perimeter of the bracket. The outer geometric profile of the inlet flange corresponds to a profile of the slot, and the slot is configured to receive and abut a portion of the outer geometric profile. A passage is formed in the second support flange and configured to receive a gas flow from the gas valve.

The present disclosure also relates to a gas valve assembly for an HVAC system having a gas valve. The gas valve includes an inlet flange defining a gas inlet and an outlet flange defining a gas outlet, where the inlet flange has an outer geometric profile. The gas valve assembly also includes a bracket having a mounting panel disposed between a first support flange and a second support flange, where the first and second support flanges extend transversely from the mounting panel. A slot is formed in the first support flange and has a profile that corresponds to the outer geometric profile of the inlet flange. The slot is configured to receive and abut a portion of the outer geometric profile. A passage formed in the second support flange and configured to align with the gas outlet of the outlet flange.

The present disclosure also relates to a gas valve assembly for an HVAC system including a gas valve having a body, an inlet flange, and an outlet flange. The inlet flange and the outlet flange protrude from the body in opposing directions along a central axis of the gas valve and respectively define a gas inlet and a gas outlet of the gas valve, and the inlet flange has an outer geometric profile. The gas valve assembly also includes a bracket having a mounting panel, a first support flange, and a second support flange, where the mounting panel extends between and is integral with the first support flange and the second support flange. A slot is formed within a lateral edge of the first support flange and has a profile that corresponds to the outer geometric profile of the inlet flange to enable lateral movement of the inlet flange along the slot and to block rotational movement of the inlet flange about the central axis. A passage is formed in the second support flange and configured to align with the gas outlet of the gas valve.

BRIEF DESCRIPTION OF THE DRAWINGS

Various aspects of this disclosure may be better understood upon reading the following detailed description and upon reference to the drawings in which.

DETAILED DESCRIPTION

Figure 1:
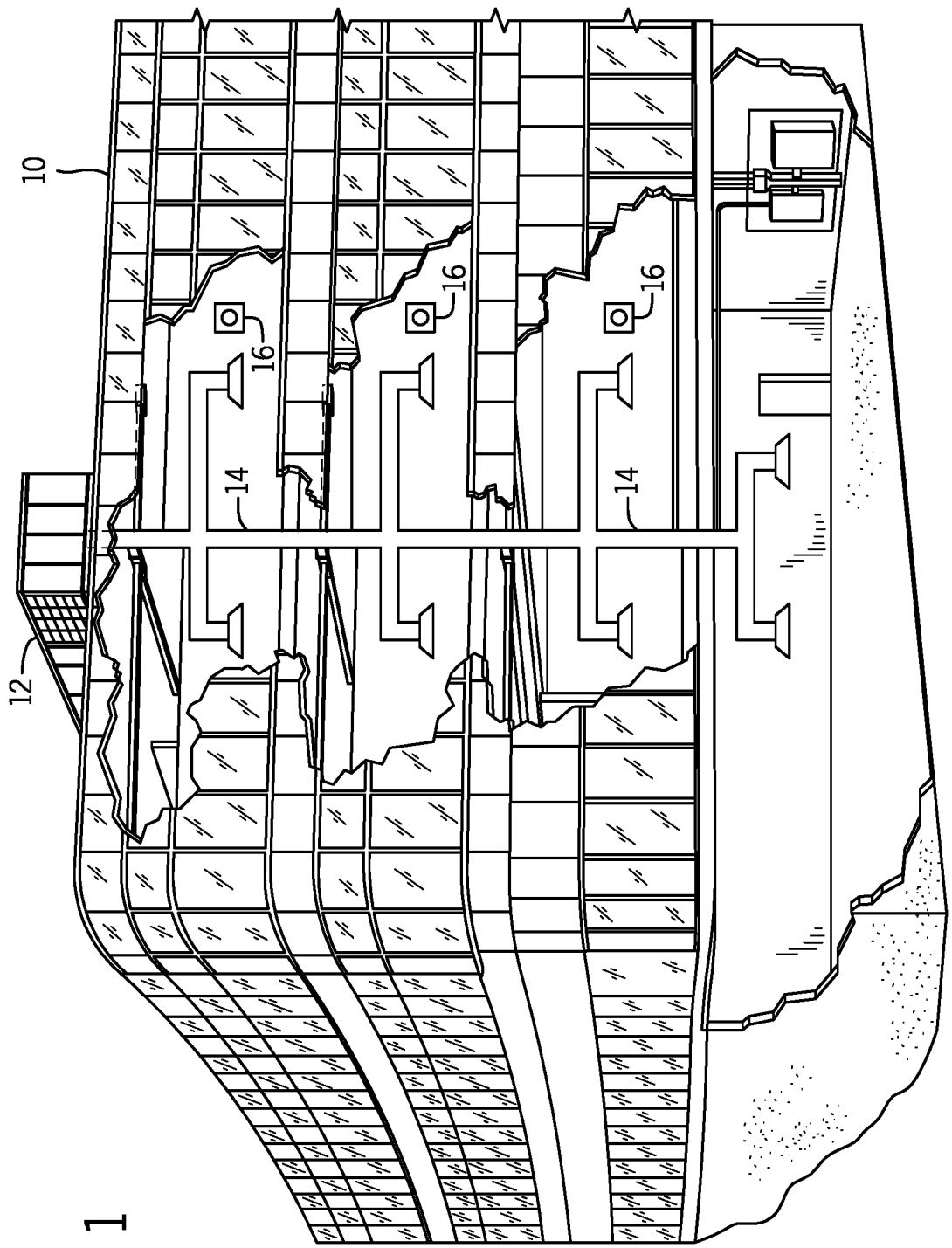
FIG. 1 is a perspective view of an embodiment of a building that may utilize a heating, ventilation, and/or air conditioning (HVAC) system in a commercial setting, in accordance with an aspect of the present disclosure.

One or more specific embodiments of the present disclosure will be described below. These described embodiments are only examples of the presently disclosed techniques. Additionally, in an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A heating, ventilation, and/or air conditioning (HVAC) system may be used to thermally regulate a space within a building, home, or other suitable structure. In many cases, HVAC systems include a furnace system that enables the supply of heated air to a room or other space within the building. As noted above, typical furnace systems generally include one or more burner assemblies that are configured to burn a mixture of fuel and air to generate hot combustion products. The combustion products generated by the burner assembly may be routed through tubes or piping of a heat exchanger that is configured to facilitate heat exchange between the combustion products and an air flow traversing the furnace system. For example, a fan may direct a flow of air across the tubes of the heat exchanger, thereby enabling the air to absorb thermal energy from the combustion products. In this manner, heated air may be exported from the furnace system and directed to rooms or spaces of the building. That is, the fan may direct the heated air through an air distribution system of the building, such as through a system of ductwork and/or suitable conduits, and thus supply the heated air to rooms or spaces of the building calling for heating. Accordingly, the furnace system may ensure that a heating demand of the building is adequately met.

A gas valve is generally used to regulate certain flow parameters of the fuel supplied to the burner assembly. As an example, the gas valve may be used to regulate a flow rate of the fuel, a pressure of the fuel, or any other suitable flow parameter(s) of the fuel. As such, the gas valve may be used to adjust an amount of combustion products generated by the furnace system and a quality of heated air supplied by the furnace system based on a heating demand of the building. In conventional furnace systems, the gas valve is often coupled directly to a manifold of the burner assembly, which may be located within a housing of the furnace system. That is, in conventional furnace systems, the burner assembly manifold may be configured to support the gas valve within the housing. Unfortunately, coupling the gas valve to the burner assembly manifold may inopportunely position the gas valve within the housing. For example, coupling the gas valve directly to the burner assembly manifold may position the gas valve within a portion of the housing where access to the gas valve may be hindered or obstructed by other furnace components within the housing or by the housing itself. Accordingly, in such cases, an operator or a service technician of the furnace system may be unable to adjust control features and/or pressure regulation equipment of the gas valve without disassembly of certain furnace system components. Moreover, the burner assembly manifold may be insufficiently sturdy or robust to mitigate movement and/or vibration of the gas valve. Further, in some cases, furnace systems having a single burner assembly may include a flexible or semi-flexible conduit that extends from the burner assembly rather than a manifold assembly, thereby enabling undesirable rotational movement and/or axial translation of the gas valve relative to the burner assembly.

It is now recognized that using a gas valve bracket to couple the gas valve to suitable portions of the furnace system may enhance accessibility to the gas valve, thereby facilitating operation and/or maintenance of the gas valve. That is, mounting the gas valve to a suitable portion of the housing of the furnace system rather than to the manifold of the burner assembly may enable various improved mounting configurations of the gas valve. For example, the gas valve bracket may enable positioning of the gas valve adjacent an access panel of the housing, thus enabling a service technician to gain unobstructed access the gas valve without involving disassembly of the furnace system. In addition, it is recognized that coupling the gas valve to the furnace system via a gas valve bracket may facilitate rigid mounting of the gas valve to the furnace system, which may mitigate or substantially reduce vibration and/or movement of the gas valve relative to the burner assembly and/or the furnace system. Accordingly, the gas valve bracket may facilitate coupling a gas valve to furnace systems having only a single burner.

As such, embodiments of the present disclosure are directed to a gas valve assembly having a gas valve bracket that is configured to facilitate coupling of the gas valve to the furnace system, as well as to restrain movement of the gas valve relative to the furnace system. The gas valve bracket includes a mounting panel having one or more apertures defined therein, which enable suitable fasteners to couple the gas valve bracket to the furnace system. The gas valve bracket may also include a first support flange and a second support flange that extend generally transversely from the mounting panel. The first support flange may include a slot define therein, which is configured to receive an inlet flange of the gas valve. More specifically, a profile of the slot may correspond to an outer geometric profile of the inlet flange, thereby enabling the gas valve to be securely positioned within the slot while rotational motion of the gas valve relative to the first support flange may be blocked.

In certain embodiments, an outlet flange of the gas valve is configured to abut or contact an interior surface of the second support flange. A passage may be defined within the second support flange and may be configured to align with a gas outlet defined within the outlet flange of the gas valve. Accordingly, a flow of fuel or gas may enter the gas valve via the inlet flange, traverse an interior of the gas valve, and discharge through the outlet flange of the gas valve and the passage of the gas valve bracket. In some embodiments, the gas valve bracket may be configured to support the gas valve in various orientations, which may enable multitudinous mounting configurations of the gas valve within the furnace system. Accordingly, the gas valve bracket may be used to mount the gas valve within various embodiments of the furnace system. These and other features will be described below with reference to the drawings.

While the present disclosure describes the gas valve bracket as configured for use in a furnace system of an HVAC system, it should be appreciated that the disclosed embodiments may be implemented within any other systems utilizing a valve or flow control device for regulating fluid flow. For example, the techniques described herein may be used to secure valves within refrigeration units, various compressors or pumping equipment, gas refining systems, or any other suitable application(s) where mounting of a flow control valve is desired.

Turning now to the drawings, FIG. 1 illustrates an embodiment of a heating, ventilation, and/or air conditioning (HVAC) system for environmental management that may employ one or more HVAC units. As used herein, an HVAC system includes any number of components configured to enable regulation of parameters related to climate characteristics, such as temperature, humidity, air flow, pressure, air quality, and so forth. For example, an "HVAC system" as used herein is defined as conventionally understood and as further described herein. Components or parts of an "HVAC system" may include, but are not limited to, all, some of, or individual parts such as a heat exchanger, a heater, an air flow control device, such as a fan, a sensor configured to detect a climate characteristic or operating parameter, a filter, a control device configured to regulate operation of an HVAC system component, a component configured to enable regulation of climate characteristics, or a combination thereof. An "HVAC system" is a system configured to provide such functions as heating, cooling, ventilation, dehumidification, pressurization, refrigeration, filtration, or any combination thereof. The embodiments described herein may be utilized in a variety of applications to control climate characteristics, such as residential, commercial, industrial, transportation, or other applications where climate control is desired.

In the illustrated embodiment, a building 10 is air conditioned by a system that includes an HVAC unit 12. The building 10 may be a commercial structure or a residential structure. As shown, the HVAC unit 12 is disposed on the roof of the building 10; however, the HVAC unit 12 may be located in other equipment rooms or areas adjacent the building 10. The HVAC unit 12 may be a single package unit containing other equipment, such as a blower, integrated air handler, and/or auxiliary heating unit. In other embodiments, the HVAC unit 12 may be part of a split HVAC system, such as the system shown in FIG. 3, which includes an outdoor HVAC unit 58 and an indoor HVAC unit 56.

The HVAC unit 12 is an air cooled device that implements a refrigeration cycle to provide conditioned air to the building 10. Specifically, the HVAC unit 12 may include one or more heat exchangers across which an air flow is passed to condition the air flow before the air flow is supplied to the building. In the illustrated embodiment, the HVAC unit 12 is a rooftop unit (RTU) that conditions a supply air stream, such as environmental air and/or a return air flow from the building 10. After the HVAC unit 12 conditions the air, the air is supplied to the building 10 via ductwork 14 extending throughout the building 10 from the HVAC unit 12. For example, the ductwork 14 may extend to various individual floors or other sections of the building 10. In certain embodiments, the HVAC unit 12 may be a heat pump that provides both heating and cooling to the building with one refrigeration circuit configured to operate in different modes. In other embodiments, the HVAC unit 12 may include one or more refrigeration circuits for cooling an air stream and a furnace for heating the air stream.

A control device 16, one type of which may be a thermostat, may be used to designate the temperature of the conditioned air. The control device 16 also may be used to control the flow of air through the ductwork 14. For example, the control device 16 may be used to regulate operation of one or more components of the HVAC unit 12 or other components, such as dampers and fans, within the building 10 that may control flow of air through and/or from the ductwork 14. In some embodiments, other devices may be included in the system, such as pressure and/or temperature transducers or switches that sense the temperatures and pressures of the supply air, return air, and so forth. Moreover, the control device 16 may include computer systems that are integrated with or separate from other building control or monitoring systems, and even systems that are remote from the building 10.

Figure 2:
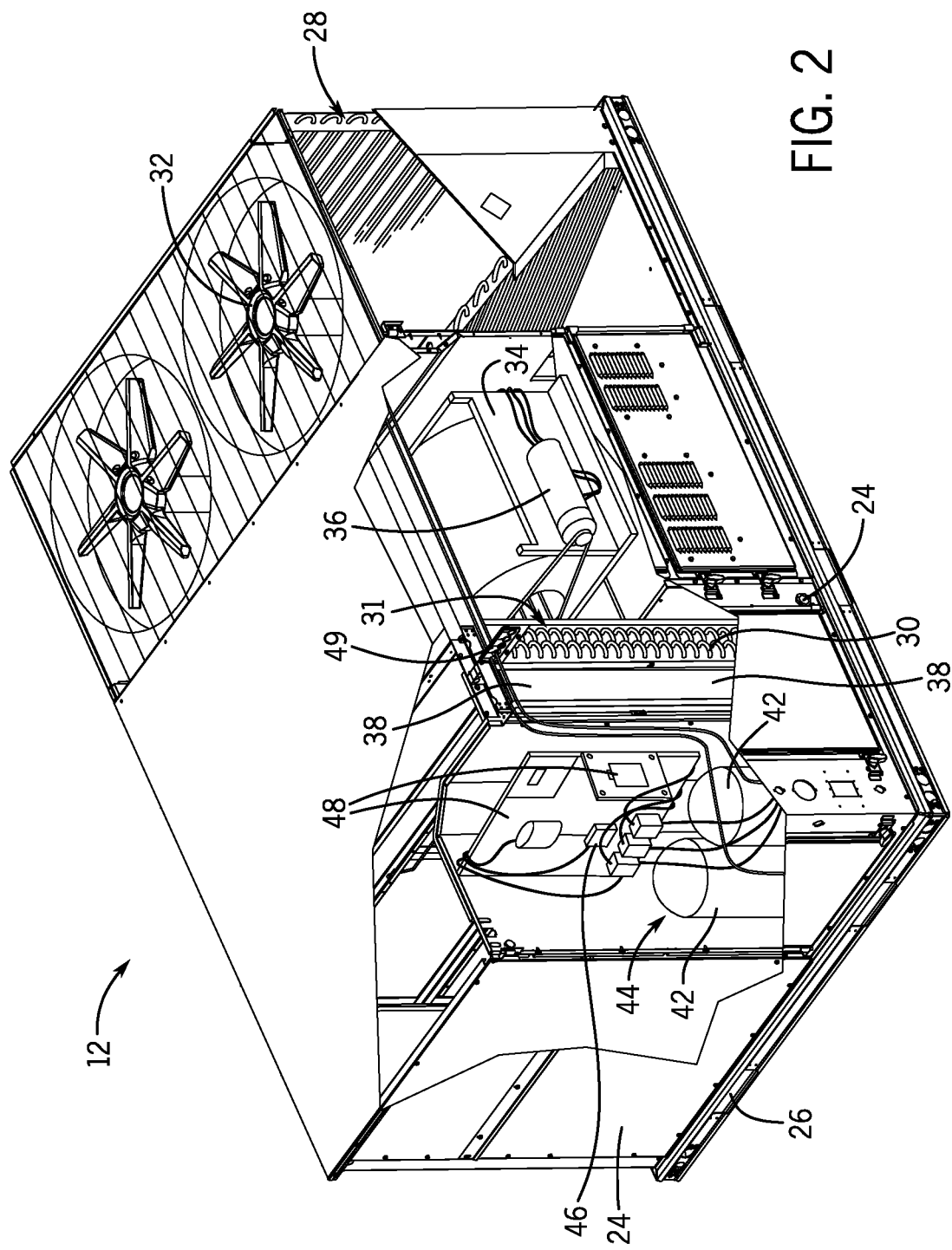
FIG. 2 is a perspective view of an embodiment of a packaged HVAC unit, in accordance with an aspect of the present disclosure.

FIG. 2 is a perspective view of an embodiment of the HVAC unit 12. In the illustrated embodiment, the HVAC unit 12 is a single package unit that may include one or more independent refrigeration circuits and components that are tested, charged, wired, piped, and ready for installation. The HVAC unit 12 may provide a variety of heating and/or cooling functions, such as cooling only, heating only, cooling with electric heat, cooling with dehumidification, cooling with gas heat, or cooling with a heat pump. As described above, the HVAC unit 12 may directly cool and/or heat an air stream provided to the building 10 to condition a space in the building 10.

As shown in the illustrated embodiment of FIG. 2, a cabinet 24 encloses the HVAC unit 12 and provides structural support and protection to the internal components from environmental and other contaminants. In some embodiments, the cabinet 24 may be constructed of galvanized steel and insulated with aluminum foil faced insulation. Rails 26 may be joined to the bottom perimeter of the cabinet 24 and provide a foundation for the HVAC unit 12. In certain embodiments, the rails 26 may provide access for a forklift and/or overhead rigging to facilitate installation and/or removal of the HVAC unit 12. In some embodiments, the rails 26 may fit into "curbs" on the roof to enable the HVAC unit 12 to provide air to the ductwork 14 from the bottom of the HVAC unit 12 while blocking elements such as rain from leaking into the building 10.

The HVAC unit 12 includes heat exchangers 28 and 30 in fluid communication with one or more refrigeration circuits. Tubes within the heat exchangers 28 and 30 may circulate refrigerant, such as R-410A, through the heat exchangers 28 and 30. The tubes may be of various types, such as multichannel tubes, conventional copper or aluminum tubing, and so forth. Together, the heat exchangers 28 and 30 may implement a thermal cycle in which the refrigerant undergoes phase changes and/or temperature changes as it flows through the heat exchangers 28 and 30 to produce heated and/or cooled air. For example, the heat exchanger 28 may function as a condenser where heat is released from the refrigerant to ambient air, and the heat exchanger 30 may function as an evaporator where the refrigerant absorbs heat to cool an air stream. In other embodiments, the HVAC unit 12 may operate in a heat pump mode where the roles of the heat exchangers 28 and 30 may be reversed. That is, the heat exchanger 28 may function as an evaporator and the heat exchanger 30 may function as a condenser. In further embodiments, the HVAC unit 12 may include a furnace for heating the air stream that is supplied to the building 10. While the illustrated embodiment of FIG. 2 shows the HVAC unit 12 having two of the heat exchangers 28 and 30, in other embodiments, the HVAC unit 12 may include one heat exchanger or more than two heat exchangers.

The heat exchanger 30 is located within a compartment 31 that separates the heat exchanger 30 from the heat exchanger 28. Fans 32 draw air from the environment through the heat exchanger 28. Air may be heated and/or cooled as the air flows through the heat exchanger 28 before being released back to the environment surrounding the rooftop unit 12. A blower assembly 34, powered by a motor 36, draws air through the heat exchanger 30 to heat or cool the air. The heated or cooled air may be directed to the building 10 by the ductwork 14, which may be connected to the HVAC unit 12. Before flowing through the heat exchanger 30, the conditioned air flows through one or more filters 38 that may remove particulates and contaminants from the air. In certain embodiments, the filters 38 may be disposed on the air intake side of the heat exchanger 30 to prevent contaminants from contacting the heat exchanger 30.

The HVAC unit 12 also may include other equipment for implementing the thermal cycle. Compressors 42 increase the pressure and temperature of the refrigerant before the refrigerant enters the heat exchanger 28. The compressors 42 may be any suitable type of compressors, such as scroll compressors, rotary compressors, screw compressors, or reciprocating compressors. In some embodiments, the compressors 42 may include a pair of hermetic direct drive compressors arranged in a dual stage configuration 44. However, in other embodiments, any number of the compressors 42 may be provided to achieve various stages of heating and/or cooling. As may be appreciated, additional equipment and devices may be included in the HVAC unit 12, such as a solid-core filter drier, a drain pan, a disconnect switch, an economizer, pressure switches, phase monitors, and humidity sensors, among other things.

The HVAC unit 12 may receive power through a terminal block 46. For example, a high voltage power source may be connected to the terminal block 46 to power the equipment. The operation of the HVAC unit 12 may be governed or regulated by a control board 48. The control board 48 may include control circuitry connected to a thermostat, sensors, and alarms. One or more of these components may be referred to herein separately or collectively as the control device 16. The control circuitry may be configured to control operation of the equipment, provide alarms, and monitor safety switches. Wiring 49 may connect the control board 48 and the terminal block 46 to the equipment of the HVAC unit 12.

Figure 3:
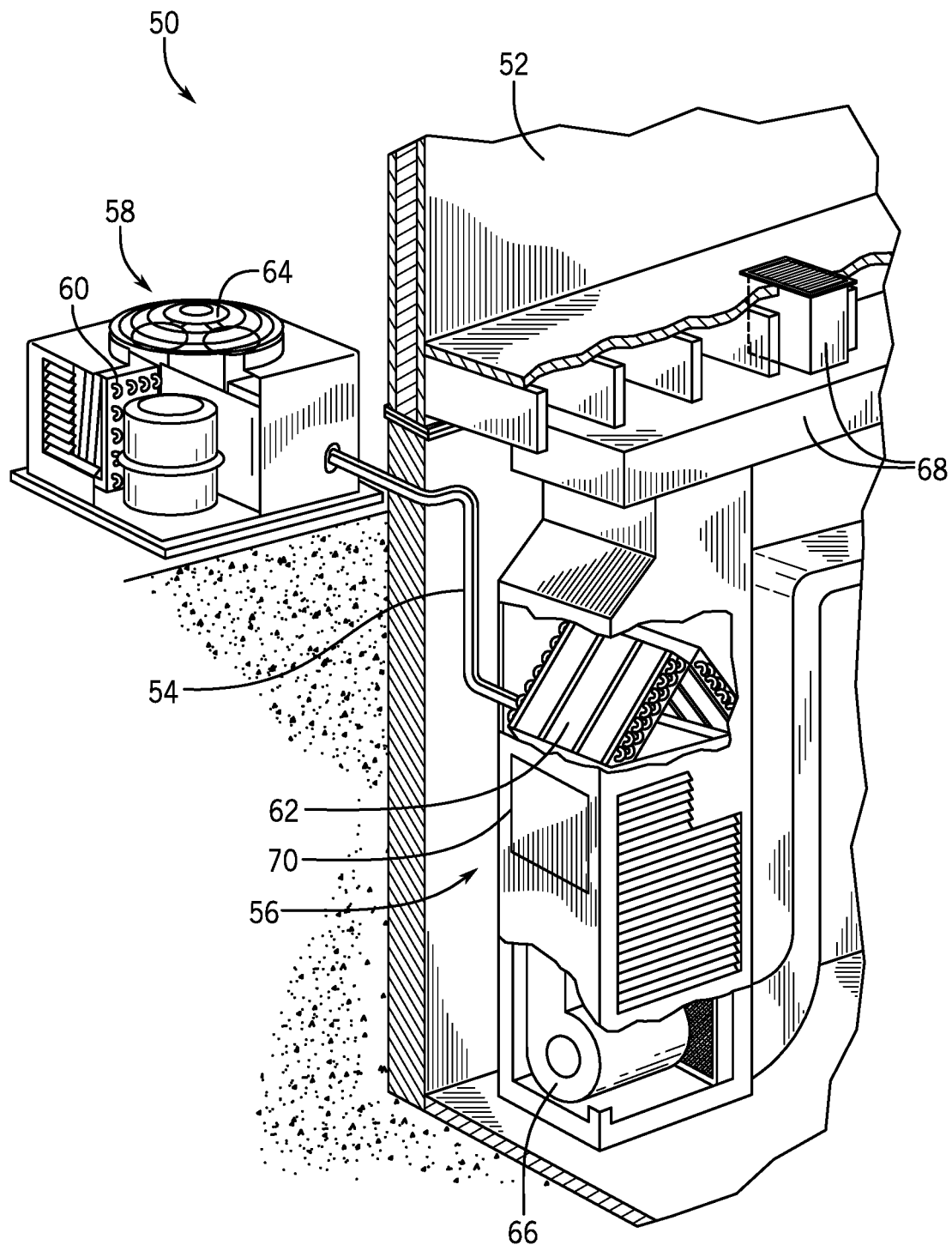
FIG. 3 is a perspective view of an embodiment of a split, residential HVAC system, in accordance with an aspect of the present disclosure.

FIG. 3 illustrates a residential heating and cooling system 50, also in accordance with present techniques. The residential heating and cooling system 50 may provide heated and cooled air to a residential structure, as well as provide outside air for ventilation and provide improved indoor air quality (IAQ) through devices such as ultraviolet lights and air filters. In the illustrated embodiment, the residential heating and cooling system 50 is a split HVAC system. In general, a residence 52 conditioned by a split HVAC system may include refrigerant conduits 54 that operatively couple the indoor unit 56 to the outdoor unit 58. The indoor unit 56 may be positioned in a utility room, an attic, a basement, and so forth. The outdoor unit 58 is typically situated adjacent to a side of residence 52 and is covered by a shroud to protect the system components and to prevent leaves and other debris or contaminants from entering the unit. The refrigerant conduits 54 transfer refrigerant between the indoor unit 56 and the outdoor unit 58, typically transferring primarily liquid refrigerant in one direction and primarily vaporized refrigerant in an opposite direction.

When the system shown in FIG. 3 is operating as an air conditioner, a heat exchanger 60 in the outdoor unit 58 serves as a condenser for re-condensing vaporized refrigerant flowing from the indoor unit 56 to the outdoor unit 58 via one of the refrigerant conduits 54. In these applications, a heat exchanger 62 of the indoor unit functions as an evaporator. Specifically, the heat exchanger 62 receives liquid refrigerant, which may be expanded by an expansion device, and evaporates the refrigerant before returning it to the outdoor unit 58.

The outdoor unit 58 draws environmental air through the heat exchanger 60 using a fan 64 and expels the air above the outdoor unit 58. When operating as an air conditioner, the air is heated by the heat exchanger 60 within the outdoor unit 58 and exits the unit at a temperature higher than it entered. The indoor unit 56 includes a blower or fan 66 that directs air through or across the indoor heat exchanger 62, where the air is cooled when the system is operating in air conditioning mode. Thereafter, the air is passed through ductwork 68 that directs the air to the residence 52. The overall system operates to maintain a desired temperature as set by a system controller. When the temperature sensed inside the residence 52 is higher than the set point on the thermostat, or a set point plus a small amount, the residential heating and cooling system 50 may become operative to refrigerate additional air for circulation through the residence 52. When the temperature reaches the set point, or a set point minus a small amount, the residential heating and cooling system 50 may stop the refrigeration cycle temporarily.

The residential heating and cooling system 50 may also operate as a heat pump. When operating as a heat pump, the roles of heat exchangers 60 and 62 are reversed. That is, the heat exchanger 60 of the outdoor unit 58 will serve as an evaporator to evaporate refrigerant and thereby cool air entering the outdoor unit 58 as the air passes over outdoor the heat exchanger 60. The indoor heat exchanger 62 will receive a stream of air blown over it and will heat the air by condensing the refrigerant.

In some embodiments, the indoor unit 56 may include a furnace system 70. For example, the indoor unit 56 may include the furnace system 70 when the residential heating and cooling system 50 is not configured to operate as a heat pump. The furnace system 70 may include a burner assembly and heat exchanger, among other components, inside the indoor unit 56. Fuel is provided to the burner assembly of the furnace 70 where it is mixed with air and combusted to form combustion products. The combustion products may pass through tubes or piping in a heat exchanger, separate from heat exchanger 62, such that air directed by the blower 66 passes over the tubes or pipes and extracts heat from the combustion products. The heated air may then be routed from the furnace system 70 to the ductwork 68 for heating the residence 52.

It should be appreciated that any of the features described herein may be incorporated with the HVAC unit 12, the residential heating and cooling system 50, or any other suitable HVAC systems. Additionally, while the features disclosed herein are described in the context of embodiments that directly heat and cool a supply air stream provided to a building or other load, embodiments of the present disclosure may be applicable to other HVAC systems as well. For example, the features described herein may be applied to mechanical cooling systems, free cooling systems, chiller systems, or other heat pump or refrigeration applications.

Figure 4:
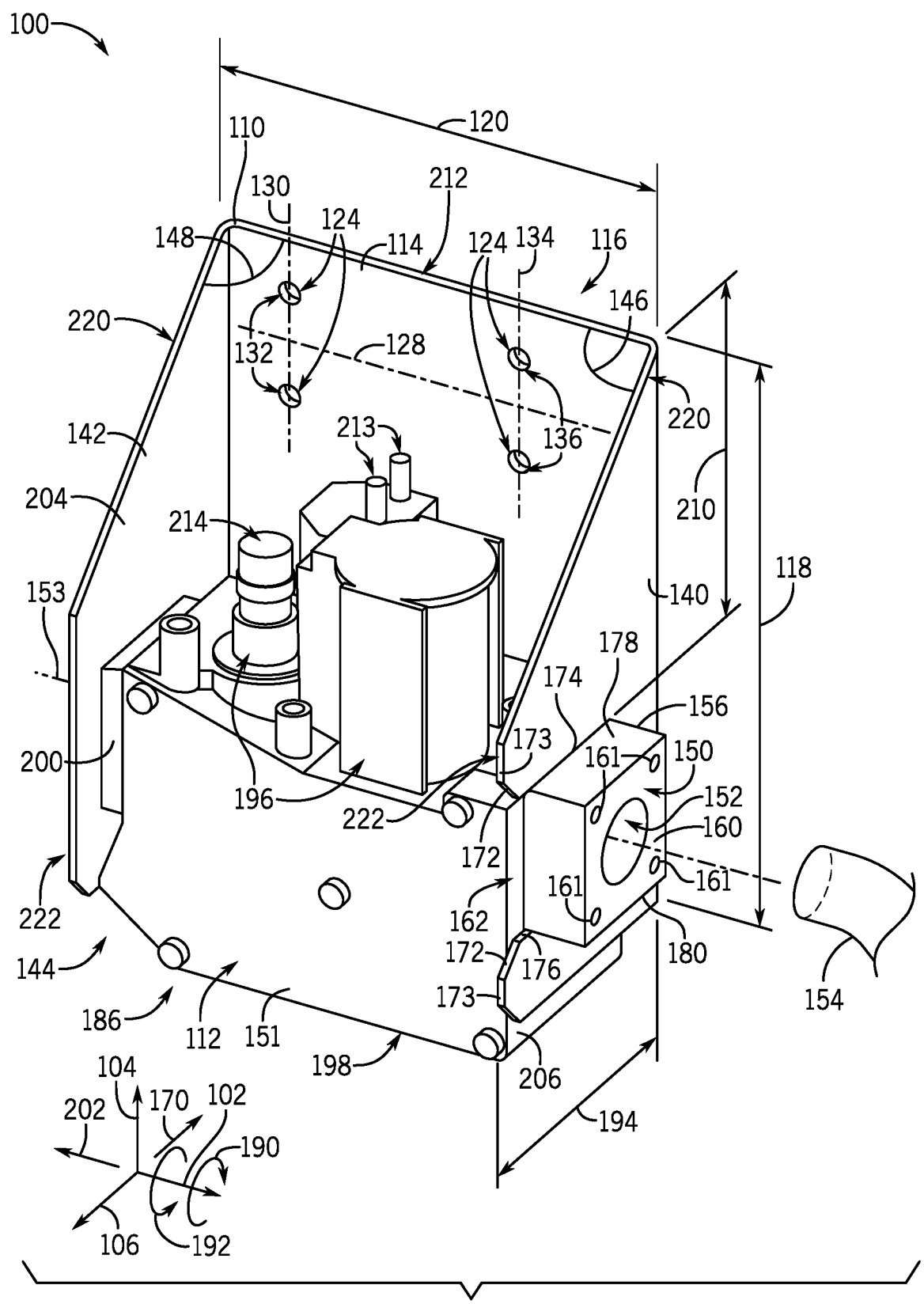
FIG. 4 is a perspective view of an embodiment of a gas valve assembly, in accordance with an aspect of the present disclosure.

With the foregoing in mind, FIG. 4 is perspective view of an embodiment of a gas valve assembly 100 that may be included in the HVAC unit 12 shown in FIG. 1, the residential heating and cooling system 50 shown in FIG. 3, a rooftop unit (RTU), or any other suitable HVAC system. To facilitate discussion, the gas valve assembly 100 and its components will be described with reference to a longitudinal axis or direction 102, a vertical axis or direction 104, and a lateral axis or direction 106. The gas valve assembly 100 includes a bracket 110 that is configured to receive and support a gas valve 112. Specifically, in an assembled configuration of the gas valve assembly 100, the bracket 110 may block lateral and/or rotational movement of the gas valve 112 relative to the longitudinal, vertical, and lateral axes 102, 104, and 106. As described in greater detail herein, the bracket 110 may be configured to couple to a suitable component of the HVAC system 12, such as a component the furnace system 70. Accordingly, the gas valve assembly 100 may facilitate coupling of the gas valve 112 to the furnace system 70 and may also restrict movement of the gas valve 112 relative to the furnace system 70.

As shown in the illustrated embodiment of FIG. 4, the bracket 110 includes a mounting panel 114 that defines a first end portion 116 of the bracket 110. In some embodiments, the mounting panel 114 may extend along a height 118 and a width 120 of the bracket 110. That is, the mounting panel 114 may define a total height and a total width of the bracket 110. It should be noted that in other embodiments, the mounting panel 114 may extend along only a portion of the total height and/or a portion of the total width of the bracket 110. The mounting panel 114 may be substantially flat and extend coplanar to a plane formed by the longitudinal axis 102 and the vertical axis 104. However, in other embodiments, the mounting panel 114 may include a bent or curved profile that extends non-uniformly along the height 118 and the width 120 of the bracket 110.

In any case, the bracket 110 may include one or more apertures 124 or holes that are defined within the mounting panel 114. The apertures 124 may enable suitable fasteners, such as screws, bolts, rivets, frictions pins, or the like, to couple the mounting panel 114 to the furnace system 70 or other portion of an HVAC system or unit. For example, the apertures 124 may be configured to align with respective receiving apertures defined within a component of the furnace system 70, a housing of the furnace system 70, or a support structure of the furnace system 70. Accordingly, cooperation between the apertures 124 and the receiving apertures may enable the fasteners to couple the bracket 110 to the furnace system 70.

In some embodiments, the apertures 124 may be arranged symmetrically across an axis of symmetry 128 that extends generally parallel to the longitudinal axis 102. As an example, the exemplary embodiment of the bracket 110 shown in FIG. 4 includes four individual apertures 124 formed within the mounting panel 114 and arranged symmetrically across the axis of symmetry 128. By arranging the apertures 124 symmetrically across the axis of symmetry 128, a first centerline 130 extending through respective centroids of a first subset 132 of the apertures 124 and a second centerline 134 extending through respective centroids of a second subset 136 of the apertures 124 may each extend generally parallel to the vertical axis 104. As discussed in detail below, this configuration may enable the bracket 110 to couple to a component of the furnace system 70 in an upright orientation 138, as shown in the illustrated embodiment of FIG. 6, or in an inverted or reverse orientation 139, as shown in the illustrated embodiment of FIG. 7. That is, because the first subset 132 of the apertures 124 and the second subset 136 of the apertures 124 are oriented symmetrically across the axis of symmetry 128, the apertures 124 may align with respective receiving apertures of the furnace system 70 in either the upright orientation 138 or the reverse orientation 139, in which the bracket 110 is rotated 180 degrees about the lateral axis 106 with respect to the upright orientation 138.

Although the first and second subsets 132, 136 of the apertures 124 each include two individual apertures 124 in the illustrated embodiment of FIG. 4, it should be noted that the first and second subsets 132, 136 may include any other suitable quantity of apertures 124. For example, the first and second subsets 132, 136 may each include 1, 2, 3, 4, 5, 6, or more than 6 apertures 124. For clarity, in embodiments of the bracket 110 where the first and second subsets 132, 136 each include only a single aperture 124, the axis of symmetry 128 may extend through respective centroids of each of these apertures 124. It should be noted that, in other embodiments, the apertures 124 may be formed within mounting panel 114 in any other suitable configuration that is symmetric across the axis of symmetry 128. Further, it should be noted that in certain embodiments, the axis of symmetry 128 may extend generally parallel to the vertical axis 104, rather than the longitudinal axis 102. In yet further embodiments, the apertures 124 may be defined within the mounting panel 114 in a non-symmetric arrangement with respect to the axis of symmetry 128. In some embodiments, one or more of the apertures 124 may be formed in an edge of the mounting panel 114, such that the apertures 124 are not fully enclosed or encircled by the mounting panel 114. Instead, the apertures 124 may be slots, channels, grooves, or other formations configured to receive fasteners.

As shown in the illustrated embodiment, the bracket 110 may include a first support flange 140 and a second support flange 142 that extend from the mounting panel 114 in the lateral direction 106 from the first end portion 116 to a second end portion 144 of the bracket 110. In certain embodiments, the first and second support flanges 140, 142 may extend generally perpendicular to the mounting panel 114. That is, an angle 146 between the first support flange 140 and the mounting panel 114, an angle 148 between the second support flange 142 and the mounting panel 114, or both, may be between about 80 degrees and about 90 degrees, between about 90 degrees and about 100 degrees, or substantially equal to 90 degrees. However, in other embodiments, the angles 146, 148 may include any other suitable angular increment.

In some embodiments, the first and second support flanges 140, 142 may be integrally formed with the mounting panel 114. For example, the bracket 110 may include a single piece of material that is bent or deformed to form the mounting panel 114, the first support flange 140, and the second support flange 142. In other embodiments, the first and second support flanges 140, 142 may be coupled to the mounting panel 114 via any suitable fasteners, adhesives, or other mechanical coupling. As an example, the first and second support flanges 140, 142 may include separate components that are coupled to the mounting panel 114 via crimp connections, bonding glue, metallurgical processes such as welding or brazing, or the like.

In some embodiments, the bracket 110 may be formed of a metallic material such as stainless steel, sheet metal, or aluminum. A thickness of the metallic material, and thus a thickness of the bracket 110, may be between about 0.5 millimeters (mm) and about 5 mm, between about 0.75 mm and about 3 mm, or between about 1 mm and about 2 mm.

However, in other embodiments, a thickness of the bracket 110 may be less than 0.5 mm or greater than 5 mm. In addition, it should be noted that the bracket 110 may be constructed of any other suitable metallic or non-metallic material in alternative to the aforementioned materials. For example, the bracket 110 may by constructed of polymeric materials, fiberglass, composite materials, adhesive manufacturing material, or any other suitable material or combination of materials.

As shown in the illustrated embodiment of FIG. 4, the gas valve 112 includes an inlet flange 150 that extends from a central body 151 the gas valve 112. Specifically, the inlet flange 150 extends along a central axis 153 of the gas valve 112 that extends generally parallel to the longitudinal axis 102. The inlet flange 150 defines an inlet 152 of the gas valve 112, which is configured to receive a gas flow from a suitable gas source. For example, in some embodiments, the inlet 152 may include internal threads that are configured to engage with external threads of a gas supply line 154. Accordingly, the gas supply line 154 may be coupled to the gas valve 112 by threading the gas supply line 154 into the inlet 152 of the gas valve 112. In this manner, the gas supply line 154 may supply a gas flow to the gas valve 112.

The inlet flange 150 may include an outer geometric profile 156 or other contour that facilitates coupling the gas supply line 154 to the gas valve 112. For example, the outer geometric profile 156 may include a quadrilateral geometry, which enables a wrench or other tool(s) to engage with the inlet flange 150. Accordingly, a service technician may use the wrench to grasp the gas valve 112 and block rotation of the gas valve 112 about the longitudinal axis 102 while threading the gas supply line 154 into the inlet 152 of the gas valve 112. That is, the service technician may use a first wrench to block rotation of the gas valve 112, while using a second wrench to threadably engage the gas supply line 154 with the inlet 152 of the gas valve 112. It should be noted that, in other embodiments, the gas supply line 154 may couple to an end face 160 of the inlet flange 150 rather than the threads disposed within the inlet 152. For example, a flange of the gas supply line 154 may include apertures that are configured to align with apertures 161 of the inlet flange 150. As such, suitable fasteners may be used to couple the gas supply line 154 to the inlet flange 150 via the apertures 161.

The first support flange 140 may include a slot 162 formed therein, where the slot 162 extends from the second end portion 144 of the bracket 110 toward the first end portion 116 of the bracket 110. In particular, the slot 162 may be defined by a portion of a perimeter of the bracket 110. In some embodiments, the slot 162 is configured to engage with and receive the inlet flange 150 of the gas valve 112. For example, a profile or contour of the slot 162 may correspond to the outer geometric profile 156 or contour of the inlet flange 150. In this manner, insertion of the gas valve 112 into the bracket 110 may be achieved by aligning the inlet flange 150 with the slot 162 and translating the gas valve 112 in a direction 170, substantially opposite the lateral direction 106. In some embodiments, the first support flange 140 may include chamfered portions 172 that facilitate guiding the inlet flange 150 into the slot 162. That is, the chamfered portions 172 may extend between a lateral edge 173 of the first support flange 140 and a respective one of a first subsection 174 of the slot 162 and a second subsection 176 of the slot 162, thereby facilitating alignment of the outer geometric profile 156 of the inlet flange 150 with the profile of the slot 162.

In an assembled configuration of the gas valve assembly 100, a first end face 178 and a second end face 180 of the inlet flange 150 may be configured to abut or contact the first subsection 174 and the second subsection 176 of the slot 162, respectively. In this manner, engagement between first and second subsections 174, 176 of the slot 162 and the first and second end faces 178, 180 of the inlet flange 150 may restrict movement of the gas valve 112 along the vertical axis 104 and block rotational movement of the gas valve 112 about the longitudinal axis 102 or the central axis 153. In some embodiments, a third end face of the inlet flange 150 extending between the first and second end faces 178, 180 may be configured to abut or contact a third subsection of slot 162 extending between the first and second subsections 174, 176, such as an inner most subsection of the slot 162, thereby restricting movement of the gas valve 112 along the direction 170. However, in other embodiments, a gap may extend between the third end face of the inlet flange 150 and the third subsection of the slot 162.

Although the outer geometric profile 156 of the inlet flange 150 includes a quadrilateral geometry in the illustrated embodiment of FIG. 4, it should be noted that the outer geometric profile 156 may include any other suitable geometry in other embodiments of the gas valve 112. As an example, the outer geometric profile 156 may include a triangular geometry, and pentagonal geometry, a hexagonal geometry, or any other suitable geometric shape. In any case, the profile of the slot 162 may be geometrically similar to the outer geometric profile 156 of the inlet flange 150, such that the inlet flange 150 may appropriately mate and engage with the slot 162. That is, in the example discussed above, the slot 162 may include a triangular profile, a pentagonal profile, or a hexagonal profile configured to engage with the triangular geometry, the pentagonal geometry, and/or the hexagonal geometry of the inlet flange 150, respectively.

In some embodiments, the outer geometric profile 156 of the inlet flange 150 may be symmetrical, thereby enabling the inlet flange 150 to engage and mate with the slot 162 in various orientations. For sake of example, the outer geometric profile 156 of the inlet flange 150 may include a square geometry. In such an example, the gas valve 112 may be disposed within the bracket 110 in a first orientation 186, as shown in the illustrated embodiment of FIG. 4, or in a second orientation 188, as shown in the illustrated embodiment of FIG. 7, in which the gas valve 112 is rotated 180 degrees about the longitudinal axis 102 with respect to the position of the bracket 110 shown in the illustrated embodiment of FIG. 4. For clarity, in the second orientation 188, the first end face 178 of the inlet flange 150 may engage with the second subsection 176 of the slot 162, while the second end face 180 of the inlet flange 150 engages with the first subsection 174 of the slot 162. As discussed in greater detail below, in this manner, the gas valve 112 may remain in an upright position, with respect to gravity, regardless of whether the bracket 110 is disposed in the upright orientation 138, as shown in the illustrated embodiment of FIG. 6, or the reverse orientation 139, as shown in the illustrated embodiment of FIG. 7.

In the present example, the gas valve 112 may also be disposed within the bracket 110 in a third orientation, in which the gas valve 112 is rotated 90 degrees about the longitudinal axis 102 in a clockwise direction 190, with respect to the first orientation 186, or a fourth orientation, in which the gas valve 122 is rotated 90 degrees about the longitudinal axis 102 in a counter-clock wise direction 192, with respect to the first orientation 186. In such embodiments, a protrusion length 194 or depth of the first support flange 140 may be sized such that control equipment 196 of the gas valve 112 does not contact or interfere with the mounting panel 114 when the gas valve 112 is in the third orientation, and a bottom surface 198 of the gas valve 112 does not contact or interfere with the mounting panel 114 when the gas valve 112 is in the fourth orientation, respectively. In this manner, the bracket 110 may enable various mounting orientations of the gas valve 112, and thereby facilitate coupling the bracket 110 and/or the gas valve 112 to multitudinous embodiments and/or components of the furnace system 70.

Figure 5:
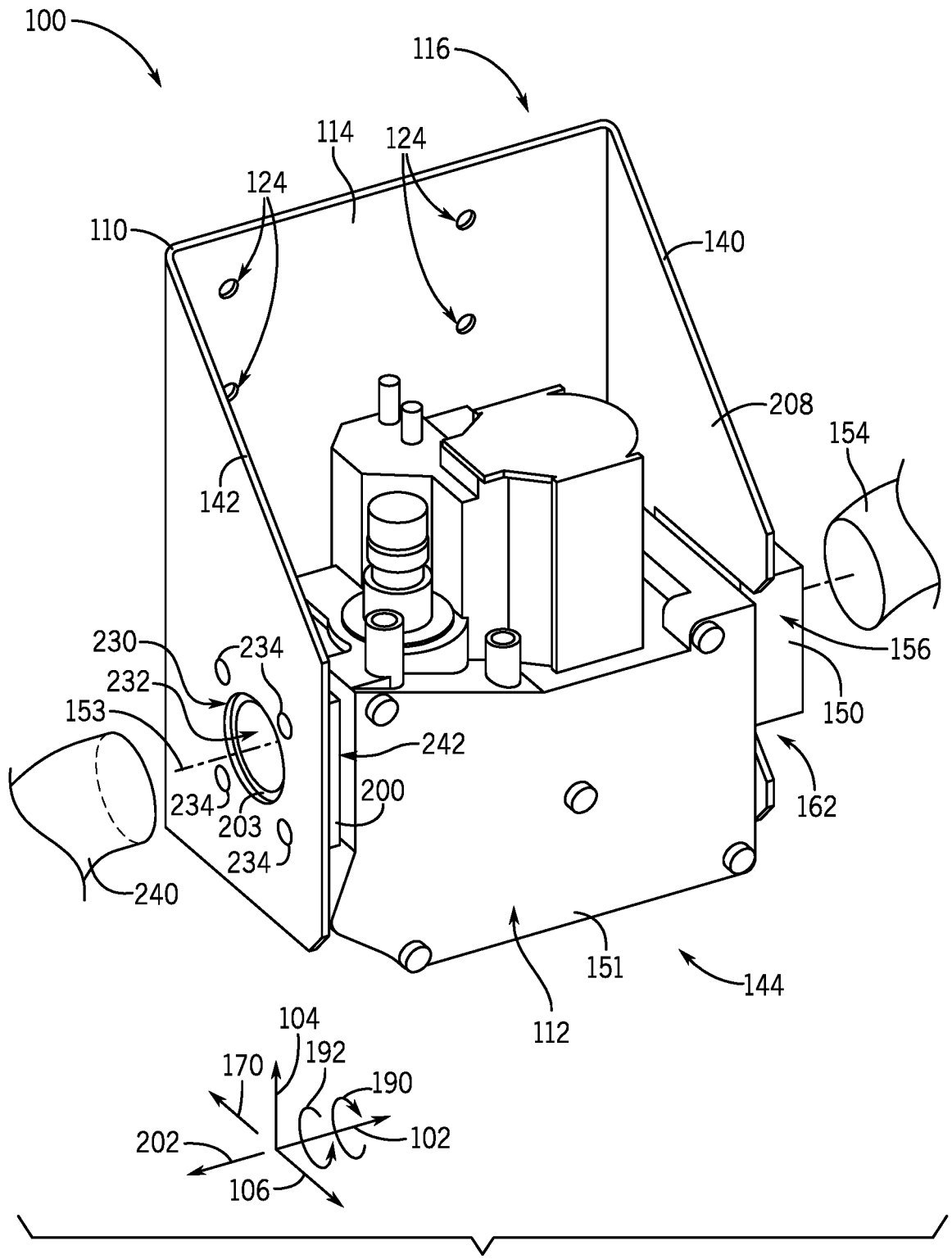
FIG. 5 is a perspective view of an embodiment of a gas valve assembly, in accordance with an aspect of the present disclosure.

The gas valve 112 includes an outlet flange 200 that extends from the central body 151 of the gas valve 112 in a direction 202. That is, the outlet flange 200 extends along the central axis 153 in a direction substantially opposite the longitudinal direction 102. In some embodiments, an end face 203, as shown in FIG. 5, of the outlet flange 200 may abut or contact an interior surface 204 of the second support flange 142 in the assembled configuration of the gas valve assembly 100. As described in greater detail below, this engagement may facilitate coupling the outlet flange 200 to the second support flange 142. In some embodiments, an end face 206 of the central body 151 may abut or contact an interior surface 208, as shown in FIG. 5, of the first support flange 140, while the end face 203 of the outlet flange 200 engages with the interior surface 204 of the second support flange 142. Accordingly, the bracket 110 may block translation or movement of the gas valve 112 along the longitudinal axis 102. However, it should be noted that, in other embodiments, a gap may extend between the interior surface 208 of the first support flange 140 and the end face 206 of the central body 151, between the interior surface 204 of the second support flange 142 and the end face 203 of the outlet flange 200, or both.

In certain embodiments, a distance 210 between an upper end portion 212 of the bracket 110 and the first subsection 174 of the slot 162 may be sized such that the gas valve 112 does not obstruct or occlude the apertures 124 in the assembled configuration of the gas valve assembly 100. As an example, the distance 210 may be sized such that the control equipment 196 of the gas valve 112 does not extend past a lower-most aperture of the apertures 124 in the vertical direction 104. In this manner, a service technician may obtain access to fasteners disposed within the apertures 124 even when the gas valve 112 is disposed within the bracket 110. Accordingly, the gas valve assembly 100 may be coupled or decoupled from the furnace system 70 as an assembly. That is, the gas valve 112 and the bracket 110 may be coupled to the furnace system 70 collectively, which may reduce an installation time of the gas valve assembly 100, as compared to an installation time of typical gas valve assemblies that may involve installation of a bracket within the furnace system 70 prior to installation of the gas valve 112 with the bracket. Moreover, the distance 210 between the upper end portion 212 of the bracket 110 and the first subsection 174 of the slot 162 may ensure that access to the pressure control equipment 196 is not obstructed when the gas valve assembly 100 is mounted to the furnace system 70. For example, the distance 210 may be sized to ensure that an operator or service technician may maintain sufficient access to an on/off switch 213 and a pressure adjustment dial 214 of the gas valve 112 when the gas valve assembly 100 is installed within the furnace system 70. In this manner, components of the furnace system 70 that may be disposed proximate the upper end portion 212 of the bracket 110 may not hinder access to the on/off switch 213 and/or the pressure adjustment dial 214.

As shown in the illustrated embodiment, upper portions 220 of the first and second support flanges 140, 142 may be chamfered, thereby reducing a quantity of material used in manufacturing the bracket 110, and thus, reducing a manufacturing cost of the bracket 110. The chamfers may extend between the mounting panel 114 and respective end faces 222 of the first and second support flanges 140, 142. Although the chamfers are shown as generally linear, it should be noted that the upper portion 220 of the first support flange 140, the second support flange 142, or both, may include any other suitable profile. For example, in certain embodiments, the upper portions 220 may include a curved profile, such as a concave profile or convex profile, a staggered profile, or any other geometric profile.

FIG. 5 is a perspective view of an embodiment of the gas valve assembly 100, illustrating a flow passage 230 that may be formed within the second support flange 142. As noted above, a gas outlet 232 may be formed within the outlet flange 200 and may extend along the central axis 153. In some embodiments, the gas outlet 232 may be configured to align with the flow passage 230 when the gas valve 112 is disposed within the bracket 110. That is, the slot 162 may be sized such that translation of the gas valve 112 into the slot 162 along the direction 170 may enable the central axis 153 of the gas valve 112 to align with a centroid of the flow passage 230.

In some embodiments, the second support flange 142 includes one or more mounting apertures 234 that are configured to align with respective apertures defined within the outlet flange 200 of the gas valve 112. Accordingly, suitable fasteners may extend through the mounting apertures 234 and into the outlet flange 200, thereby coupling the gas valve 112 to the bracket 110. In certain embodiments, the mounting apertures 234 may be disposed substantially symmetrically about the flow passage 230. In this manner, the mounting apertures 234 may align with the receiving apertures within the outlet flange 200 regardless of an orientation of the gas valve 112 within the bracket 110. That is, in the exemplary embodiments of the gas valve assembly 100 discussed herein, the mounting apertures 234 may align with the receiving apertures of the gas valve 112 regardless of whether the gas valve 112 is disposed in the first orientation 186, the second orientation 188, the third orientation, or the fourth orientation described herein. Although four mounting apertures 234 are shown in the illustrated embodiment of FIG. 5, it should be noted that the second support flange 142 include any suitable quantity of mounting apertures 234 that correspond to respective receiving apertures of the gas valve 112. For example, the second support flange 142 may include 1, 2, 3, 4, 5, 6, or more than 6 mounting apertures 234 configured to align with 1, 2, 3, 4, 5, 6, or more than 6 receiving apertures of the gas valve 112, respectively.

In some embodiments, the gas outlet 232 may include internal threads that are configured to engage with external threads of a burner assembly 240 of the furnace system 70. Accordingly, the burner assembly 240 may engage with and thread into the outlet flange 200 of the gas valve 112, thereby fluidly coupling the gas valve 112 to the burner assembly 240. Accordingly, the gas valve 112 may be used to regulate a flow rate, a pressure, or any other suitable parameter(s) of a gas flowing from the gas supply line 154 to the burner assembly 240. In certain embodiments, an orifice plate may be disposed between the gas outlet 232 and the burner assembly 240, or within the gas outlet 232, and facilitate regulation of a flow rate of the gas flow in addition to, or in lieu of, the gas valve 112.

It should be noted that, in certain embodiments, an outer geometric profile 242 of the outlet flange 200 may be equal to, or substantially similar to the outer geometric profile 156 of the inlet flange 150. In such embodiments, the gas valve 112 may be mounted bi-directionally within the bracket 110. That is, the gas valve 112 may be mounted within the bracket 110 in an inverted configuration in which the outlet flange 200 is received by the slot 162 and the end face 160 of the inlet flange 150 abuts the interior surface 204 of the second support flange 142. Accordingly, suitable fasteners may couple the inlet flange 150 to the second support flange 142 via the apertures 161 disposed within the inlet flange 150.

Figure 6:
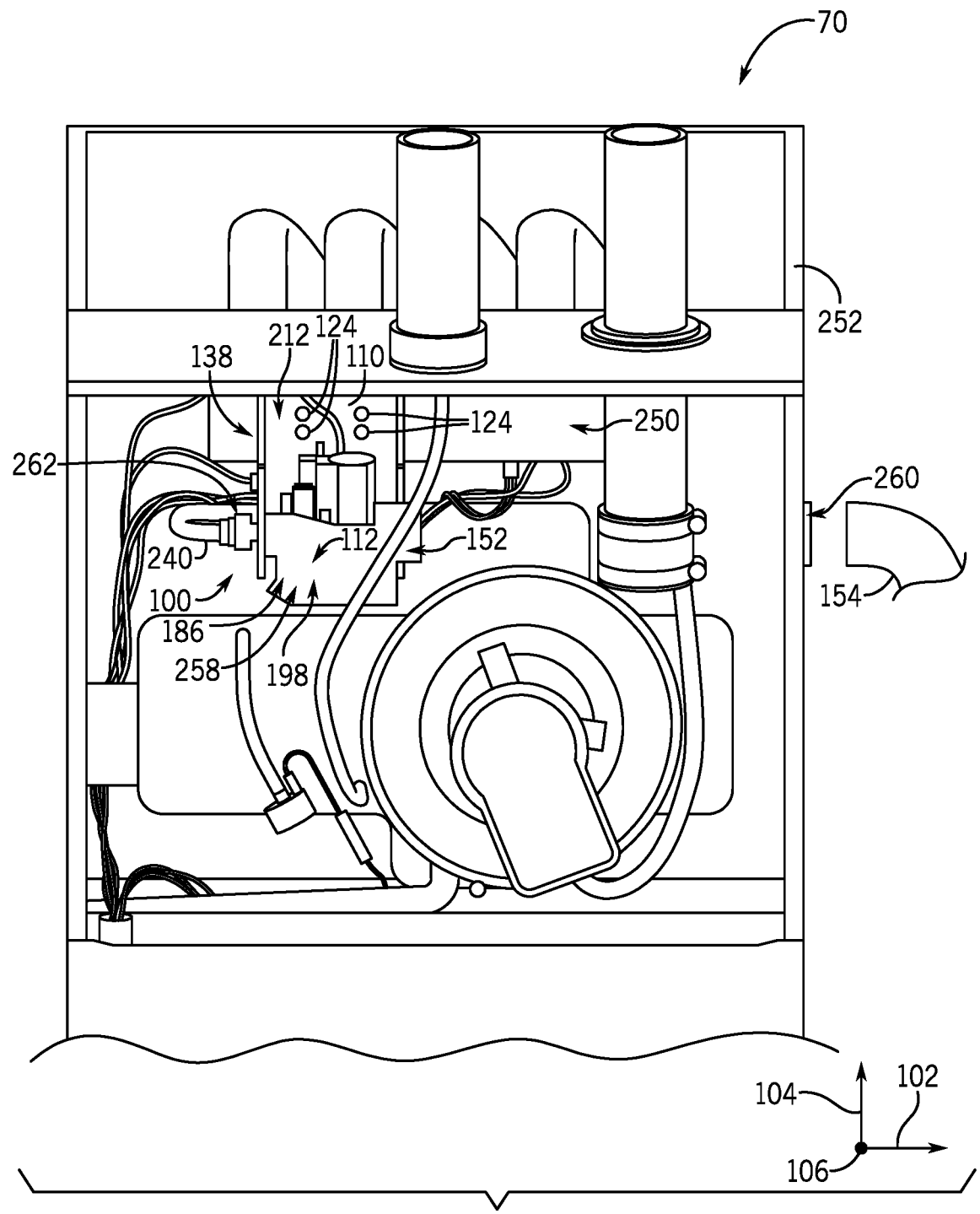
FIG. 6 is a perspective view of an embodiment of a furnace system having a gas valve assembly disposed in an upright orientation, in accordance with an aspect of the present disclosure.

FIG. 6 is a perspective view of an embodiment of the furnace system 70 having the gas valve assembly 100. As shown in the illustrated embodiment, the bracket 110 is coupled to a support structure 250 disposed within a housing 252 of the furnace system 70 or HVAC unit. More specifically, the bracket 110 is coupled to the support structure 250 in the upright orientation 138, such that the upper end portion 212 of the bracket 110 is disposed above a lower end portion 258 of the bracket 110 with respect to a direction of gravity. The gas valve 112 is coupled to the bracket 110 in the first orientation 186. Accordingly, the control equipment 196 may be oriented in an upright position, thereby facilitating access to the on/off switch 213 and the pressure adjustment dial 214. That is, the control equipment 196 may be disposed above the bottom surface 198 of the gas valve 112 with respect to a direction of gravity.

The gas valve assembly 100 may enable the gas valve 112 to be rigidly coupled to the furnace system 70, such that movement and/or vibration of the gas valve 112 relative to the housing 252 and/or components within the housing 252 is reduced or substantially mitigated. In some embodiments, the gas valve assembly 100 thereby facilitates coupling the gas valve 112 to a furnace system 70 having only a single burner, which may not include a burner assembly manifold. For clarity, it should be noted that the support structure 250 may include any suitable component disposed within the housing 252 or exterior to the housing 252 of the furnace system 70 or other HVAC unit or system. Further, in some embodiments, the support structure 250 may include a portion of the housing 252 itself.

In some embodiments, the bracket 110 may be sized to position the gas valve 112 within the housing 252 such that the inlet 152 of the gas valve 112 is aligned with a gas line aperture 260 disposed within a side panel of the housing 252. Accordingly, the bracket 110 may facilitate extending the gas supply line 154 through the gas line aperture 260 and coupling the gas supply line 154 to the inlet 152 of the gas valve 112. That is, the bracket 110 may block rotational motion or translational movement of the gas valve 112 while a service technician couples the gas supply line 154 to the gas valve 112. As noted above, the furnace system 70 may also include a gas orifice 262 or coupling that is disposed between the burner assembly 240 and the gas valve 112. As such, the gas valve 112 and/or the gas orifice 262 may facilitate regulating gas flow from the gas supply line 154 to the burner assembly 240 of the furnace system 70.

Figure 7:
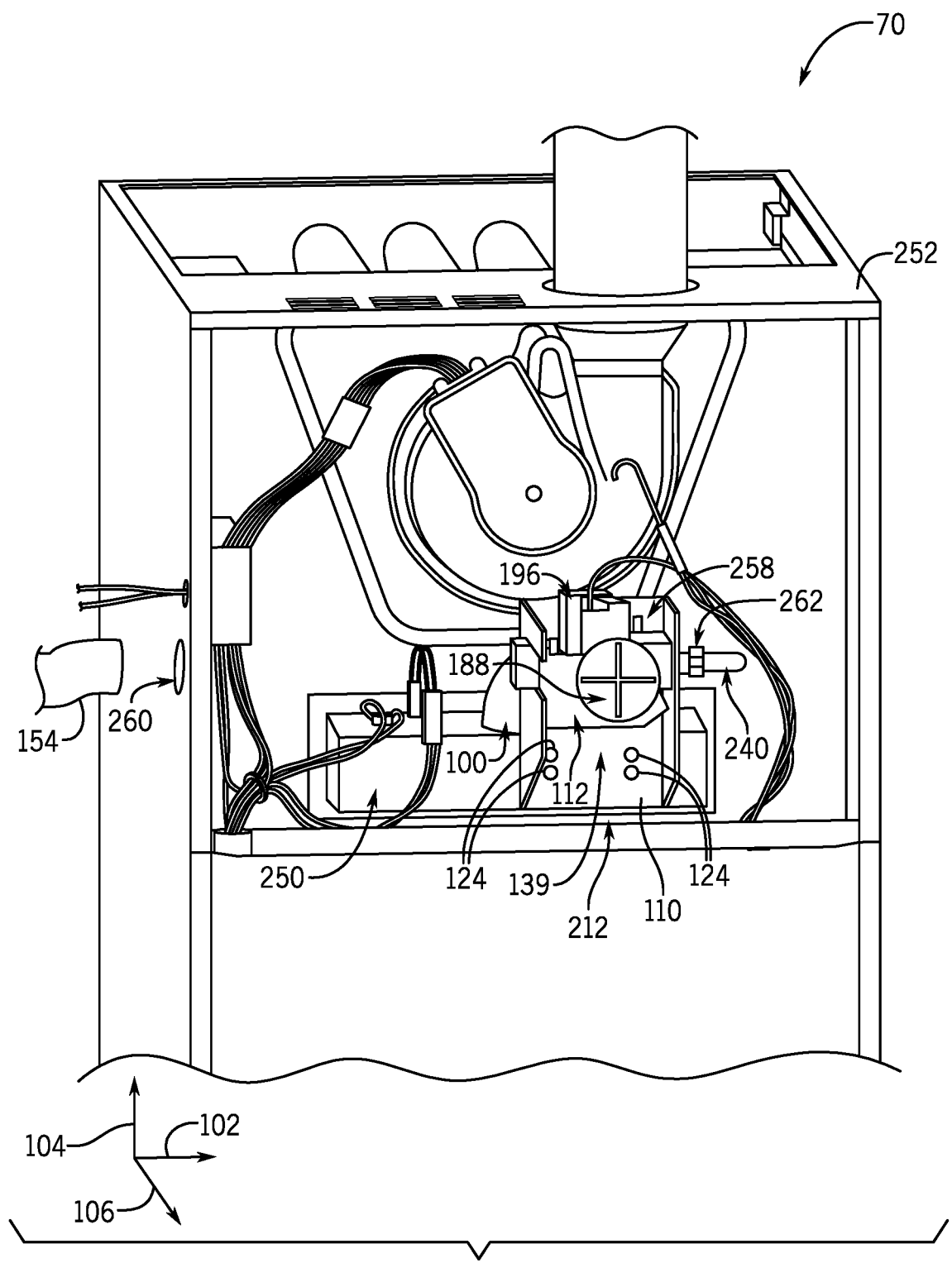
FIG. 7 is a perspective view of an embodiment of a furnace system having a gas valve assembly disposed in a reversed orientation, in accordance with an aspect of the present disclosure.

FIG. 7 is a perspective view of another embodiment of the furnace system 70 having the gas valve assembly 100. In the illustrated embodiment, the bracket 110 is coupled to the support structure 250 in the inverted or reverse orientation 139, in which the upper end portion 212 of the bracket 110 is positioned below the lower end portion 258 of the bracket 110 with respect to a direction of gravity. The gas valve 112 is disposed within the bracket 110 in the second orientation 188. In this manner, the control equipment 196 of the gas valve 112 may remain in the upright position, with respect to gravity, even though the bracket 110 is coupled to the support structure 250 in the reverse orientation 139. The bracket 110 may similarly position the gas valve 112 such that the inlet 152 of the gas valve 112 aligns with the gas line aperture 260 disposed within the housing 252.

Accordingly, the gas valve assembly 100 may enable various mounting arrangements of the gas valve 112 within the housing 252. In particular, the common geometries of the outer geometric profile 156 of the inlet flange 150 and the profile of the slot 162 may enable an enhanced mounting versatility of the gas valve assembly 100. That is, because the gas valve 112 may be coupled to the bracket 110 in various orientations, and the bracket 110 may in turn be coupled to the furnace system 70 in various orientations, the gas valve assembly 100 facilitates mounting the gas valve 112 within multitudinous embodiments of the furnace system 70. As such, the adjustable mounting configurations of the bracket 110 and the gas valve 112 may facilitate coupling the bracket 112 to a multitude of suitable components of the furnace system 70 and/or an HVAC system or unit. For example, the bracket 110 may be mounted to a portion of the burner assembly 240, the support structure 250, the housing 252, or any other suitable portion(s) of the furnace system 70 without obstruction of access to the control equipment 196 of the gas valve 112.

Technical effects of the gas valve assembly 100 include improved mounting versatility of the gas valve 112, such that the gas valve 112 may be mounted within various embodiments of the furnace system 70. In addition, the gas valve assembly 100 may facilitate rigid coupling of the gas valve 112 to the furnace system 70, thereby mitigating or substantially reducing undesirable movement and/or vibration of the gas valve 112 relative to the furnace system 70. Further, the gas valve assembly 100 may facilitate installation of conduit or piping between the gas valve 112 and the burner assembly 240 and/or the gas supply line 154. That is, the bracket 110 of the gas valve assembly 100 may retain a position of the gas valve 112 during engagement or disengagement of the gas supply line 154 and/or the burner assembly 240 from the gas valve 112.

As discussed above, the aforementioned embodiments of the gas valve assembly 100 may be used on the HVAC unit 12, the residential heating and cooling system 50, or in any other suitable HVAC systems. Additionally, the specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The invention claimed is:

1. A gas valve assembly for a furnace, comprising:
a gas valve, comprising:
an inlet flange configured to receive a gas supply line, wherein the inlet flange defines a gas inlet of the gas valve configured to receive a gas flow from the gas supply line, wherein the inlet flange has an outer geometric profile; and
an outlet flange, wherein the outlet flange comprises an end face forming a distal end of the gas valve;
a bracket including a mounting panel, a first support flange, and a second support flange, wherein the mounting panel extends between and is integral with the first support flange and the second support flange, wherein the second support flange is configured to abut the end face of the outlet flange;

a slot formed in the first support flange and defined by a portion of an outer perimeter of the bracket, wherein the outer geometric profile of the inlet flange corresponds to a profile of the slot, and wherein the outer perimeter defines an opening of the slot that is configured to receive the inlet flange and enable the inlet flange to translate into the slot such that edges of the slot receive and abut a corresponding portion of the outer geometric profile; and a passage formed in the second support flange and configured to receive the gas flow from the gas valve.

2. The gas valve assembly of claim 1, wherein the second support flange has a fastener aperture formed therein, and wherein the gas valve assembly comprises a fastener extending through the fastener aperture into the outlet flange to secure the second support flange to the gas valve.

3. The gas valve assembly of claim 1, wherein the inlet flange extends outwardly from a body of the gas valve along a central axis of the gas valve, wherein a surface of the body is configured to abut an interior surface of the first support flange.

4. The gas valve assembly of claim 1, wherein the first support flange, the second support flange, or both, extend orthogonally from the mounting panel.

5. The gas valve assembly of claim 1, wherein the mounting panel has a plurality of fastener apertures formed therein, wherein the plurality of fastener apertures is disposed substantially symmetrically across an axis of symmetry extending generally parallel to a width of the bracket.

6. The gas valve assembly of claim 1, wherein the outlet flange has an additional outer geometric profile, and wherein the additional outer geometric profile is the same as the outer geometric profile of the inlet flange.

7. The gas valve assembly of claim 1, wherein the bracket is a single-piece component formed from a single piece of material, wherein the outer perimeter of the bracket is defined by outer edges of the single piece of material.

8. The gas valve assembly of claim 7, wherein the profile of the slot is a polygonal profile.

9. The gas valve assembly of claim 1, wherein the second support flange has a plurality of fastener apertures formed therein and arrayed about the passage, wherein the plurality of fastener apertures is configured to align with corresponding fastener apertures formed in the outlet flange.

10. The gas valve assembly of claim 1, comprising a support structure of the furnace, wherein the mounting panel is configured to couple to the support structure.

11. The gas valve assembly of claim 10, wherein the mounting panel comprises a plurality of fastener apertures formed therein, wherein the plurality of fastener apertures is configured to receive fasteners therethrough to couple the mounting panel to the support structure.

12. The gas valve assembly of claim 1, wherein the second support flange comprises a fastener aperture formed therein, and wherein the outlet flange is configured to receive a fastener extending through the fastener aperture to secure the second support flange to the gas valve.

13. A gas valve assembly for an HVAC system, comprising:

a gas valve including an inlet flange defining a gas inlet and an outlet flange defining a gas outlet, wherein the inlet flange is configured to receive a gas supply line and has an outer geometric profile;

a bracket including a mounting panel disposed between a first support flange and a second support flange, wherein the first support flange and the second support flange extend transversely from the mounting panel, wherein the second support flange comprises a fastener aperture formed therein, and wherein the outlet flange is configured to receive a fastener extending through the fastener aperture to secure the second support flange to the gas valve;

a slot formed in the first support flange and defined by a portion of an outer perimeter of the bracket, wherein the slot has a profile that corresponds to the outer geometric profile of the inlet flange, wherein the outer perimeter defines an opening of the slot that is configured to receive the inlet flange and enable the inlet flange to translate into the slot such that edges of the slot receive and abut a corresponding portion of the outer geometric profile; and a passage formed in the second support flange and configured to align with the gas outlet of the outlet flange.

14. The gas valve assembly of claim 13, wherein the inlet flange protrudes from a surface of the gas valve and extends along a central axis of the gas valve, wherein the surface is configured to abut an interior surface of the first support flange.

15. The gas valve assembly of claim 14, wherein the outlet flange extends along the central axis and terminates at an end face of the outlet flange, wherein the end face forms a distal end of the gas valve, and wherein the end face is configured to abut a corresponding interior surface of the second support flange.

16. The gas valve assembly of claim 13, wherein the first support flange and the second support flange comprise a first chamfered portion and a second chamfered portion, respectively, wherein the first chamfered portion and the second chamfered portion extend between the mounting panel and a respective lateral edge of the first support flange and the second support flange.

17. The gas valve assembly of claim 13, wherein the fastener aperture is one of a plurality of fastener apertures formed within the second support flange, wherein the plurality of fastener apertures is disposed substantially symmetrically about the passage and is configured to align with corresponding fastener apertures formed within the outlet flange.

18. A gas valve assembly for an HVAC system, comprising:

a gas valve including a body, an inlet flange, and an outlet flange, wherein the inlet flange and the outlet flange protrude from the body in opposing directions along a central axis of the gas valve and respectively define a gas inlet and a gas outlet of the gas valve, wherein the inlet flange has an outer geometric profile;

a bracket including a mounting panel, a first support flange, and a second support flange, wherein the mounting panel extends between and is integral with the first support flange and the second support flange, wherein the second support flange comprises a fastener aperture formed therein, and wherein the outlet flange is configured to receive a fastener extending through the fastener aperture to secure the second support flange to the gas valve;

a slot formed within a lateral edge of the first support flange, wherein the slot has a profile that corresponds to the outer geometric profile of the inlet flange to enable lateral movement of the inlet flange along the slot and to block rotational movement of the inlet flange about the central axis; and a passage formed in the second support flange and configured to align with the gas outlet of the gas valve.

19. The gas valve assembly of claim 18, wherein the first support flange and the second support flange each extend orthogonally from the mounting panel.

20. The gas valve assembly of claim 18, wherein the inlet flange extends from a surface of the body, wherein the surface is configured to abut an interior surface of the first support flange.

21. The gas valve assembly of claim 20, wherein the outlet flange terminates at an end face of the outlet flange, wherein the end face is configured to abut a corresponding interior surface of the second support flange.

22. The gas valve of claim 18, wherein the mounting panel has a plurality of fastener apertures formed therein, wherein the plurality of fastener apertures comprises the fastener aperture, and wherein the plurality of fastener apertures is disposed substantially symmetrically about an axis of symmetry extending generally parallel to the central axis.

* * * * *